(12) United States Patent
Byrne (10) Patent No.: US 9,648,986 B1
(45) Date of Patent: May 16, 2017

(54) FOOD PREPARATION SYSTEM AND ASSOCIATED METHODS

(71) Applicant: Brenda Byrne, Raymore, MO (US)

(72) Inventor: Brenda Byrne, Raymore, MO (US)

(*) Notice: Subject to any disclaimer, the term of this patent is extended or adjusted under 35 U.S.C. 154(b) by 15 days.

(21) Appl. No.: 14/534,888

(22) Filed: Nov. 6, 2014

Related U.S. Application Data (60) Provisional application No. 61/904,316, filed on Nov. 14, 2013, provisional application No. 61/905,517, filed on Nov. 18, 2013.

(51) Int. Cl.
| | | |
|---|---|---|
| *A21C 3/02* | (2006.01) | |
| *A47J 47/00* | (2006.01) | |
| *A23P 1/10* | (2006.01) | |
| *A21C 11/00* | (2006.01) | |
| *A21C 9/06* | (2006.01) | |
| *A21C 3/00* | (2006.01) | |

(52) U.S. Cl.
CPC .............. *A47J 47/00* (2013.01); *A23P 1/10* (2013.01); *A21C 3/00* (2013.01); *A21C 3/02* (2013.01); *A21C 3/021* (2013.01); *A21C 3/022* (2013.01); *A21C 9/063* (2013.01); *A21C 11/004* (2013.01); *A21C 11/006* (2013.01); *A21C 11/008* (2013.01)

(58) Field of Classification Search
CPC .. A21C 3/00; A21C 3/02; A21C 3/021; A21C 3/022; A21C 11/004; A21C 11/006; A21C 11/008; A21C 9/063; A21C 9/088; A47J 47/00
USPC .................................. 425/89, 390, 394, 395
See application file for complete search history.

(56) References Cited

U.S. PATENT DOCUMENTS

| | | | | | |
|---|---|---|---|---|---|
| 1,873,716 A | * | 8/1932 | Nickerson | .............. | B65D 85/36 206/412 |
| 2,260,780 A | * | 10/1941 | Holly | ....................... | A21C 3/00 425/318 |
| 2,555,033 A | * | 5/1951 | Harris | .................... | B65D 75/38 206/454 |
| 2,616,376 A | * | 11/1952 | Hammerstein | .......... | A21C 3/00 33/1 R |
| 2,744,475 A | * | 5/1956 | Ayres | ....................... | A21C 3/02 206/484 |
| 3,194,185 A | * | 7/1965 | Spinosa | ................. | A21C 3/021 383/207 |
| 4,053,641 A | * | 10/1977 | Elling | ...................... | A21D 8/02 426/19 |
| 4,228,731 A | * | 10/1980 | Butler | ..................... | A47J 43/20 99/433 |
| 4,687,670 A | * | 8/1987 | Rodriguez | ............. | A21C 9/063 426/283 |
| 4,691,627 A | * | 9/1987 | Roberts | .................. | A21C 9/063 99/450.2 |

(Continued)

*Primary Examiner* — Seyed Masoud Malekzadeh
(74) *Attorney, Agent, or Firm* — Dentons US LLP; Brian R. McGinley; Roman Tsibulevskiy (57) ABSTRACT

In accordance with one aspect of the present disclosure, a food preparation system is disclosed comprising a mat including a deformable material permitting a first portion of the mat to be folded onto a second portion of the mat, and at least one utensil defining a height. The at least one utensil is positionable between the first and second portions of the mat such that a food product positioned between the first and second portions of the mat can be flattened to a thickness approximately equivalent to the height of the at least one utensil by applying a force to the mat.

17 Claims, 6 Drawing Sheets

(56) References Cited

U.S. PATENT DOCUMENTS

| | | | | |
|---|---|---|---|---|
| 5,667,821 | A | * | 9/1997 | Castaneda ............... A21C 11/00 425/218 |
| 7,604,827 | B1 | * | 10/2009 | Lavoie ................. A21D 10/025 426/112 |
| 7,842,323 | B1 | * | 11/2010 | White ....................... A21D 8/08 426/502 |
| 2003/0003211 | A1 | * | 1/2003 | Kanafani ................ A21B 3/132 426/523 |
| 2004/0142063 | A1 | * | 7/2004 | Kolz ...................... A21C 3/021 425/298 |
| 2005/0072317 | A1 | * | 4/2005 | Thorstad ................. A47J 43/20 99/450.1 |
| 2006/0110496 | A1 | * | 5/2006 | Dyer ...................... A21C 9/063 426/94 |
| 2009/0214691 | A1 | * | 8/2009 | Alvidrez ............... A21C 11/008 425/374 |
| 2010/0024664 | A1 | * | 2/2010 | Rolland ................. A21C 9/063 99/450.6 |
| 2010/0112145 | A1 | * | 5/2010 | Nilsson ............. B65D 81/3453 426/107 |
| 2010/0189854 | A1 | * | 7/2010 | Assius ................. A21C 15/007 426/275 |
| 2010/0247729 | A1 | * | 9/2010 | Van Blokland ........ A21C 9/063 426/502 |
| 2011/0088567 | A1 | * | 4/2011 | Deroulers .............. A21B 3/138 99/426 |
| 2012/0118174 | A1 | * | 5/2012 | Ji ............................ A21B 3/15 99/441 |

* cited by examiner

FOOD PREPARATION SYSTEM AND ASSOCIATED METHODS

CROSS-REFERENCE TO RELATED APPLICATIONS

This application claims the benefit of, and priority to, U.S. Provisional Patent Application Ser. Nos. 61/904,316 and 61/905,517, filed on Nov. 14, 2013 and Nov. 18, 2013, respectively, the entire contents of which are hereby incorporated by reference.

BACKGROUND

The present disclosure relates generally to a food preparation system that includes a mat and one or more utensils, as well as associated methods of use.

BACKGROUND OF THE RELATED ART

In the culinary arts, it is often necessary or desirable to roll out (flatten) a food product, e.g., dough, in order to achieve a desired aesthetic, and/or promote even cooking of the food product. Food products are typically rolled out (flattened) using either wax paper or a cooking mat, a rolling pin, and a non-stick additive, e.g., oil, flour, etc., to inhibit undesirable adhesion to the food products. These methods, however, present a number of drawbacks. For example, the use of wax paper and/or a cooking mat can create unintended deformities, e.g., creases, lines, etc., during rolling (flattening) of the food product. Additionally, the use of a non-stick additive, e.g., oil, flour, etc., can result in unintended, and perhaps undesirable, changes to the texture, flavor, and/or appearance of the food product. Known methods can also yield a food product of uneven thickness, and create unnecessary waste in the form of excess oil, excess flour, and/or soiled wax paper, for example.

The present disclosure addresses these deficiencies, among others, by describing a food preparation system and associated methods that minimize waste, as well as deformities on, and adhesion to, food products, while increasing uniformity in the thickness of the rolled (flattened) food products.

SUMMARY

In accordance with one aspect of the present disclosure, a food preparation system is disclosed that includes a mat, and at least one utensil defining a height. The mat includes a deformable material permitting a first portion of the mat to be folded onto a second portion of the mat. The at least one utensil is positionable between the first and second portions of the mat such that a food product positioned between the first and second portions of the mat can be flattened to a thickness approximately equivalent to the height of the at least one utensil by applying a force to the mat.

The mat and the at least one utensil may include a food grade material inhibiting adhesion to the food product, e.g., food grade silicone.

In one embodiment, the at least one utensil defines an interior space configured to receive the food product, e.g., a circular interior space, a square interior space, etc.

In another embodiment, the least one utensil includes a first utensil and a discrete second utensil. In such embodiments, the first and second utensils may include corresponding engagement structure, e.g., respective first and second cutouts corresponding in configuration and dimensions, to facilitate connection of the first and second utensils.

In certain embodiments, the first and second utensils may be identical in configuration and dimensions.

In another embodiment, the at least one utensil includes a pair of first utensils and a pair of second utensils, which may be configured and dimensioned for arrangement in a vertically stacked orientation to increase the thickness of the food product. In certain embodiments, the pair of first utensils may define a first height, and the pair of second utensils may define a second height different than the first height.

In another embodiment, the mat may include at least one marking providing a user with information regarding one or more dimensions of the food product. For example, the at least one marking may be configured as a graduated ruler, or as one or more circles, e.g., a plurality of concentric circles.

In another aspect of the present disclosure, a method of preparing food is disclosed that includes: (i) positioning a food product on a mat including a food grade, deformable material inhibiting adhesion between the food product and the mat; (ii) folding the mat such that the food product is positioned between first and second portions of the mat; (iii) flattening the food product by applying a force to the mat subsequent to folding of the mat; (iv) unfolding the mat to separate the food product from the first portion of the mat; and (v) separating the food product from the second portion of the mat.

The method may further include positioning at least one utensil on the mat such that the at least one utensil is located between the first and second portions of the mat.

In certain embodiments, flattening the food product may include flattening the food product to a thickness approximately equivalent to a height defined by the at least one utensil.

BRIEF DESCRIPTION OF THE DRAWINGS

Various embodiments of the presently disclosed food preparation system and associated methods are described herein with reference to the drawings wherein like references numerals identify similar or identical elements.

DETAILED DESCRIPTION

Various embodiments of the presently disclosed food preparation system and associated methods will now be described. While the food preparation system and associated methods described herein below may be discussed in the context of baking, it should be appreciated that the structures and methods described herein are equally applicable in other contexts. Throughout the present disclosure, the terms "flatten," "roll," and variations thereof may be used interchangeably, and should be understood to encompass any procedure by which one or more dimensions of a food product are altered through the application of an external force.

Figure 1:
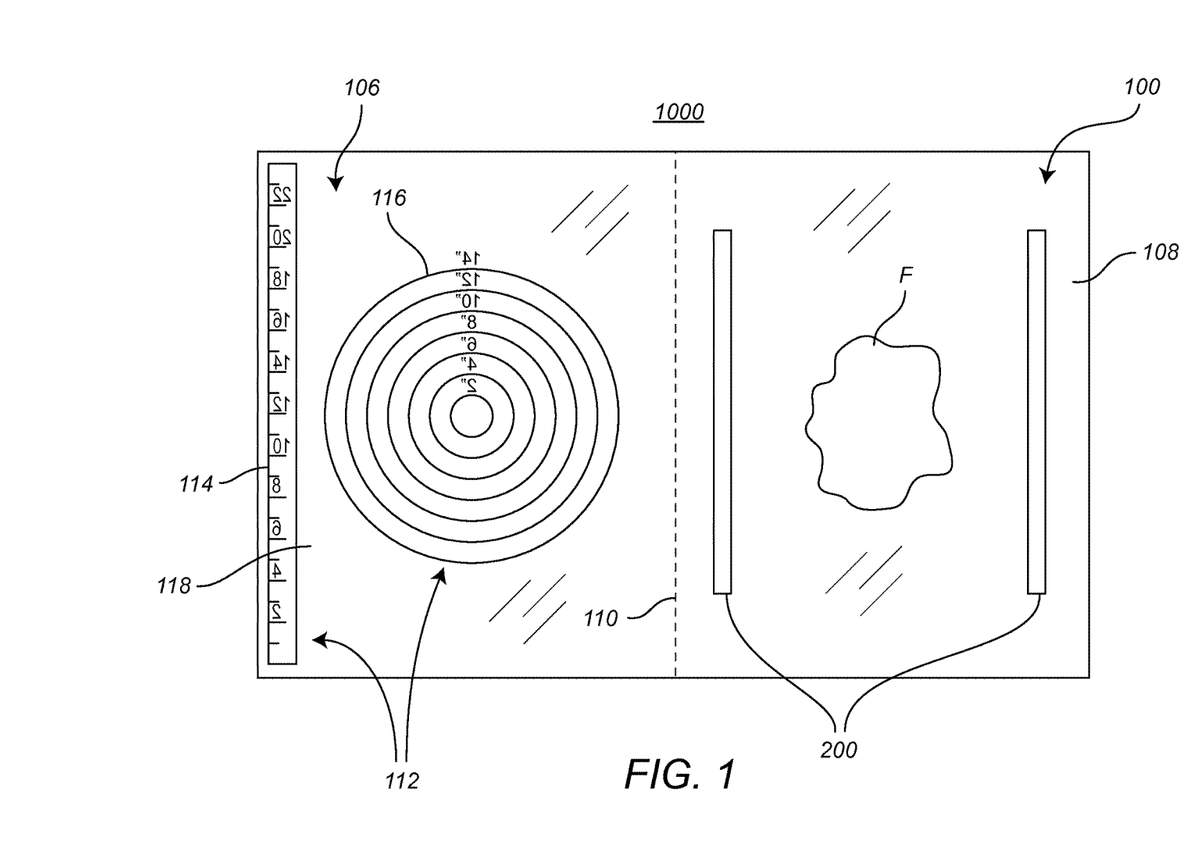
FIG. 1 is a top, plan view of one embodiment of the presently disclosed food preparation system, which includes a mat, shown in an initial (unfolded) configuration, and a pair of utensils for use with the mat.

Referring now to FIG. 1, one embodiment of the presently disclosed food preparation system is shown, which is identified generally by the reference numeral 1000, for use in preparing one or more food products "F" in a variety of applications, e.g., baking. The food preparation system 1000 includes a mat 100, and one or more utensils 200.

The mat 100 includes, e.g., is formed partially or entirely from, a deformable material that minimizes adhesion between the mat 100 and the food product(s) "F," thereby reducing, if not completely eliminating, the need for a non-stick additive, such as flour, oil, or the like, which may otherwise compromise the intended texture, flavor, appearance, etc. of the food product(s) "F." For example, the mat 100 may be formed from a heat-resistant food grade silicone. In one particular embodiment, the mat 100 is formed from food grade silicone that is reinforced with a fiberglass mesh (not shown).

Figure 2:
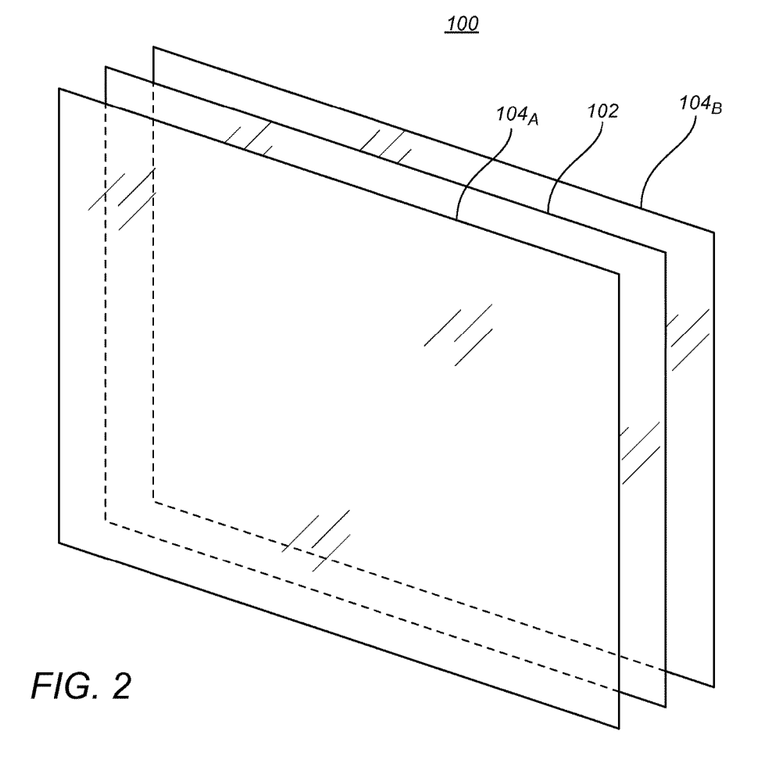
FIG. 2 is a side, perspective view of one embodiment of the mat seen in FIG. 1.

To facilitate visualization of the food product "F" through the mat 100, it is envisioned that the material(s) of construction used in fabrication of the mat 100 may be partially or entirely transparent or translucent. For example, with reference to FIG. 2, the mat 100 may be formed from a layer 102 of clear, flexible vinyl that is positioned between layers $104_A$, $104_B$ of silicone sulfide.

The mat 100 is reconfigurable between an initial (unfolded) configuration (FIG. 1) in which the mat 100 is generally planar, and a subsequent (folded) configuration (FIG. 3) in which a first portion 106 of the mat 100 is folded onto a second portion 108 of the mat 100. Although illustrated as comprising equivalent halves of the mat 100 in FIGS. 1 and 3, in alternate embodiments, the configuration and/or dimensions of the first portion 106 may deviate from those of the second portion 108. To facilitate reconfiguration between the initial (unfolded) configuration and the subsequent (folded) configuration, the mat 100 may include a weakened portion 110, e.g., a fold, living hinge, series of perforations, or the like.

In one embodiment, such as that illustrated in FIG. 1, the mat may include one or more markings 112 that provide information regarding one or more dimensions of the food product to the user. For example, as illustrated in FIG. 1, the marking(s) 112 may include a graduated ruler 114 and/or one or more measuring circles 116, each of which may allow the user to measure and monitor the length, width, diameter, etc. of the food product(s) "F" during preparation.

The marking(s) 112 may be positioned in any suitable location. For example, in those embodiments where the material(s) of construction used in fabrication of the mat 100 are partially or entirely transparent or translucent, the marking(s) 112 may be positioned on an inner surface 118 of the mat 100, as seen in FIG. 1.

In one embodiment, it is envisioned that the outer periphery of the mat 100 may include structure(s) creating a reusable seal, e.g., an adhesive, a zipper, etc., that may be opened and closed by the user to facilitate use of the mat 100 to store the food product(s) "F."

Figure 3:
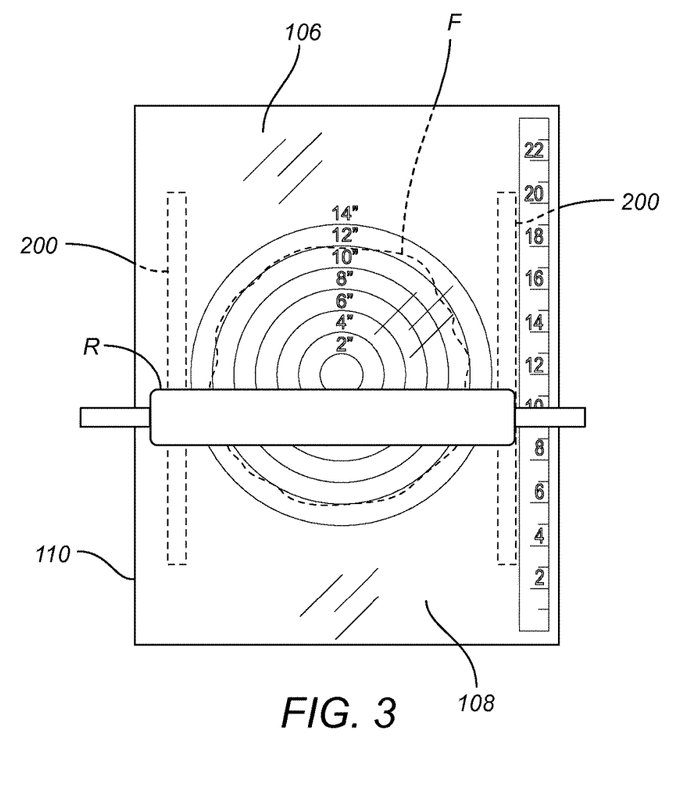
FIG. 3 is a top, plan view of the food preparation system seen in FIG. 1 with the mat shown in a subsequent (folded) configuration.
Figure 4:
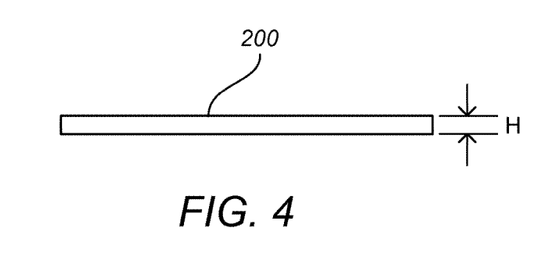
FIG. 4 is a side, elevational view of the utensil(s) seen in FIG. 1.

With reference now to FIGS. 1, 3, and 4, the utensil(s) 200 will be discussed. In the illustrated embodiment, the system 1000 is depicted as including a pair of identical, discrete utensils 200 each defining an equivalent height "H" (FIG. 4), e.g., ⅛", ¼", ½" 1", etc. Like the mat 100, the utensil(s) 200 may be formed from a food grade material, e.g., food grade silicone, that minimizes adhesion between the utensil(s) 200 and the food product(s) "F."

The utensil(s) 200 are configured and dimensioned for positioning between the respective first and second portions 106, 108 (FIGS. 1, 3) of the mat 100 in the subsequent (folded) configuration (FIG. 3). The utensil(s) 200 facilitate preparation, e.g., rolling, flattening, or molding of the food product "F," in a manner that achieves a substantially uniform thickness, as will be discussed in further detail below. Moreover, the utensil(s) 200 inhibit unintended displacement of the food product "F" relative to the mat 100 during preparation.

With continued reference to FIGS. 1, 3, and 4, a method of using the system 1000 during preparation of the food product "F" will discussed. Initially, the food product "F" is placed on the mat 100, and the utensil(s) 200 are positioned adjacent the food product "F," as illustrated in FIG. 1. Thereafter, the mat 100 is folded such that the food product "F" and the utensil(s) 200 are positioned between the respective first and second portions 106, 108 of the mat 100, as seen in FIG. 3. A force is then applied to the mat 100, e.g., manually by the user, or through use of a rolling pin "R" (FIG. 3), dowel (not shown), or the like. The force is transmitted to the food product "F" through the mat 100, thereby flattening the food product "F." For example, when the system 1000 is used in conjunction with a rolling pin "R" (FIG. 3), the rolling pin "R" can positioned so as to be rolled across the mat 100 along the utensil(s) 200.

As the force is applied to the food product "F," the food product "F" expands outwardly in various directions. Dependent upon the size and initial dimensions of the food product "F," it is envisioned that the food product "F" may contact the utensil(s) 200 during use of the system 1000.

The utensil(s) 200 limit the extent to which the food product "F" can be flattened such that the overall thickness of the food product "F" after flattening is approximately equivalent to, e.g., within ±10% of, the height "H" (FIG. 4) of the utensil(s) 200, thereby creating a food product "F" that is substantially uniform in height. The term "substantially" is meant to encompass the vast majority of the food product "F," except, for example, those peripheral portions of the food product "F" which may have a reduced thickness, or those portions of the food product "F" including rigid ingredients, such as nuts or the like.

After flattening of the food product "F," the mat 100 is returned to the initial (unfolded) configuration (FIG. 1), whereby the food product "F" is separated from the first portion 106 of the mat 100, e.g., by "peeling" the first portion 106 of the mat 100 away from the food product "F." Thereafter, the utensil(s) 200 can be removed from the mat 100, and the food product "F" can be separated from the second portion 108 of the mat 100, e.g., by turning over the mat 100 and the food product "F," and "peeling" the second portion 108 of the mat 100 away from the food product "F." The food product "F" can then subsequently be treated in any desired manner. For example, the food product "F" can be transferred to a vessel for baking, cooking, etc.

With reference now to FIGS. 5-11, various embodiments of the presently disclosed utensil(s) will be described, each of which may be used in connection with the aforedescribed mat 100. Each embodiment of the utensil(s) described in connection with FIGS. 5-11 below is identical to the utensil(s) 200 discussed above in connection with FIGS. 1, 3, and 4 but for any distinctions that are specifically noted. Accordingly, a discussion of certain features common to the utensils discussed above and the various embodiments discussed below may be omitted in the interest of brevity.

Figure 5:
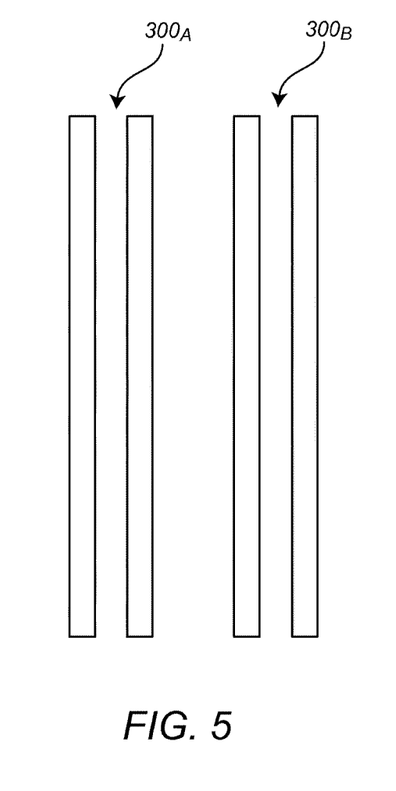
FIG. 5 is a top, plan view illustrating an alternate embodiment of the utensils seen in FIG. 1.
Figure 6:
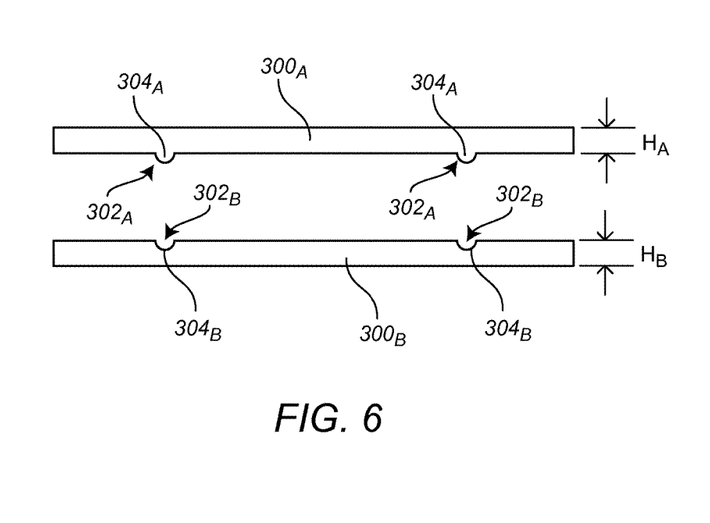
FIG. 6 is a side, elevational view illustrating an alternate embodiment of the utensils seen in FIG. 5.

FIGS. 5 and 6 illustrate a first pair of utensils $300_A$ each defining a first height $H_A$, and a second pair of utensils $300_B$ each defining a second height $H_B$. It is envisioned that the heights $H_A$, $H_B$ may be either equivalent to each other, or that the height $H_A$ of the utensils $300_A$ may be greater than the height $H_B$ of the utensils $300_B$.

During preparation of the food product "F" (FIG. 1), the pairs of utensils $300_A$, $300_B$ may be used exclusively, i.e., such that the food product "F" realizes a substantially uniform thickness approximately equal to, e.g., within ±10% of, either $H_A$ or $H_B$ after flattening, or in combination with one another. For example, the utensils $300_A$, $300_B$ may be stacked (vertically) on top of one another such that the food product "F" realizes a substantially uniform thickness approximately equal to, e.g., within ±10% of, the sum of $H_A$ and $H_B$. To facilitate such stacking, in one embodiment, the utensils $300_A$, $300_B$ may include corresponding engagement structures $302_A$, $302_B$ (FIG. 6), respectively. For example, as illustrated in FIG. 6, in one embodiment, the utensils $300_A$ may include one or more projections $304_A$ positionable within one or more corresponding recesses $304_B$ formed in the utensils $300_B$ to temporarily secure the utensils $300_A$, $300_B$ together. It should be appreciated that the projections $304_A$ and recesses $304_B$ may assume any configuration suitable for the intended purpose of temporarily securing together the utensils $300_A$, $300_B$, such as ribs, channels, or the like. Additionally, or alternatively, it is envisioned that the corresponding engagement structures $302_A$, $302_B$ may include one or more magnets, or any other (food grade) structure facilitating connection of the utensils $300_A$, $300_B$.

Figure 7:
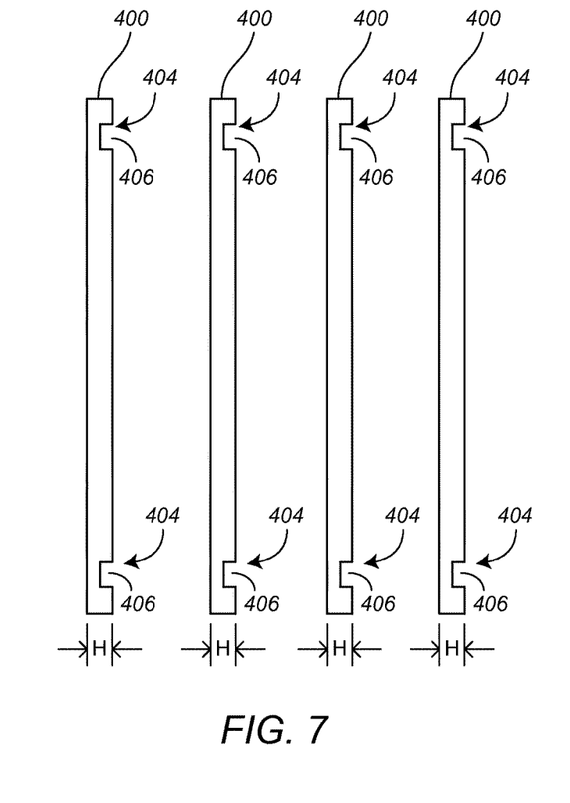
FIG. 7 is a top, plan view illustrating an alternate embodiment of the utensils seen in FIG. 1.
Figure 8:
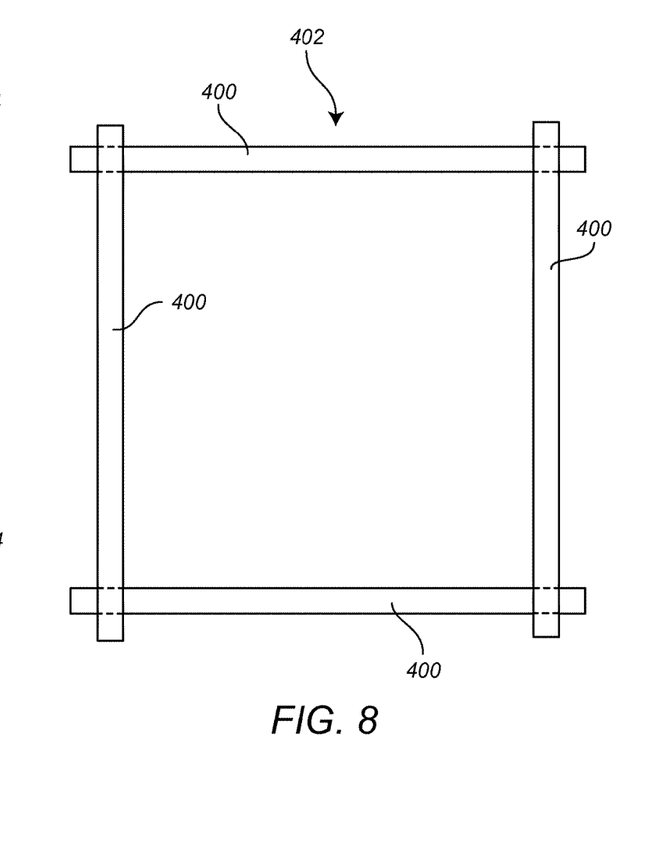
FIG. 8 is a top, plan view of a mold formed by connecting the utensils seen in FIG. 7.

With reference now to FIGS. 7 and 8, a series of identical utensils 400 are illustrated that are configured and dimensioned for engagement with one another to form a mold 402. To facilitate engagement and creation of the mold 402, each of the utensils 400 includes engagement structure 404. For example, in the embodiment illustrated in FIGS. 7 and 8, each of the utensils 400 may include a series of cutouts 406.

To form the mold 402, two of the utensils 400 are inverted and arranged such that the cutouts 406 formed in the inverted utensils 400 overlie the cutouts 406 formed in the remaining utensils 400, as seen in FIG. 8, whereby the mold 402 defines a height approximately equivalent to, e.g., within ±10% of, the height "H" of the utensils 400.

While four (4) utensils 400 are shown in FIGS. 7 and 8, dependent upon the desired geometrical configuration of the mold 402, the number of utensils 400 may be increased or decreased. For example, three (3) utensils 400 may be connected to form a triangular mold, six (6) utensils 400 may be connected to form a hexagonal mold, etc.

During use, the food product "F" is placed on the mat 100 (FIG. 1) within the mold 402 (FIG. 8) defined by the utensils 400. Thereafter, the mat 100 (FIG. 1) is folded such that the food product "F" and the mold 402 are positioned between the respective first and second portions 106, 108 (FIG. 1) of the mat 100, and a force is applied to the mat 100 as discussed above.

As the force is applied to the food product "F," the food product "F" expands to fill the mold 402, thereby assuming the geometrical shape defined by the mold 402, and defining an overall thickness that is approximately equivalent to, e.g., within ±10% of, the height "H" of the utensils 400, and substantially uniform across the food product "F," as discussed above. It should be noted that the volume of the food product "F" may exceed the capacity of the mold 402. In such instances, it may be necessary to remove excess portions of the food product "F" to achieve the desired results.

Figure 9:
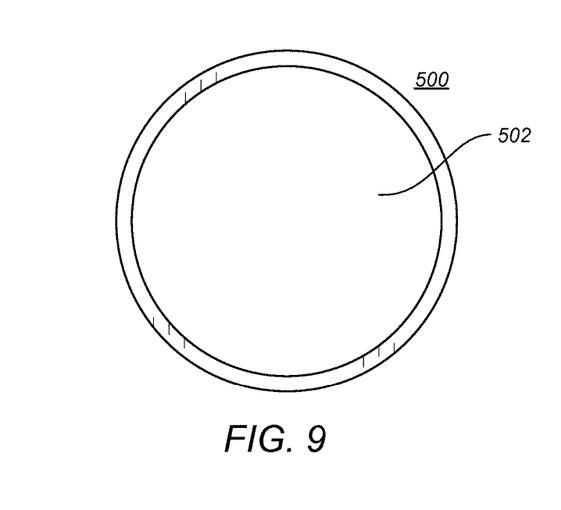
FIG. 9 is a top, plan view illustrating an alternate embodiment of the utensil seen in FIG. 1.

With reference now to FIG. 9, a single utensil 500 is shown that defines an interior space 502 configured and dimensioned to receive the food product "F." Although illustrated as circular in configuration, the utensil 500 may assume any desired geometrical configuration in alternate embodiments of the disclosure, e.g., square shaped (FIG. 10), elliptical (FIG. 11), etc. The utensil 500 may be either unitary in configuration, or alternatively, may be formed from a plurality of connectable segments (not shown).

During use, the food product "F" is placed on the mat 100 (FIG. 1) within the interior space 502 (FIG. 9) defined by the utensil 500, and the mat 100 is folded such that the food product "F" and the utensil 500 are positioned between the respective first and second portions 106, 108 (FIG. 1) of the mat 100. A force is then applied to the mat 100 in the manner discussed above such that the food product "F" expands to fill the interior space 502, thereby assuming the geometrical shape defined by the utensil 500.

Figure 10:
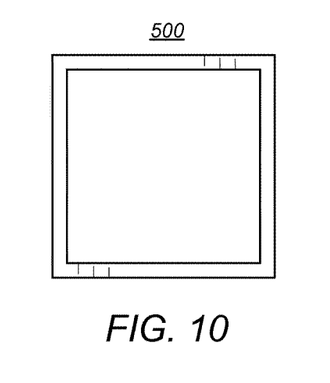
FIG. 10 is a top, plan view illustrating an alternate embodiment of the utensil seen in FIG. 1.
Figure 11:
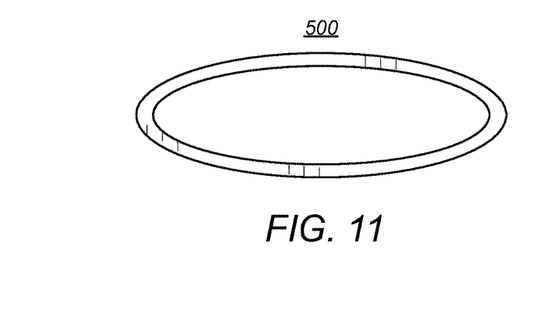
FIG. 11 is a top, plan view illustrating an alternate embodiment of the utensil seen in FIG. 1.

Persons skilled in the art will understand that the various embodiments of the food preparation system, mat, utensils, and associated methods specifically described herein and illustrated in the accompanying figures are non-limiting, exemplary embodiments, and that the written description, disclosure, and figures should be construed as being merely exemplary of the particular embodiments disclosed. It is to be understood, therefore, that the present disclosure is not limited to the particular embodiments disclosed herein, and that various other changes and modifications may be effected by one skilled in the art without departing from the scope of the present disclosure. Additionally, it is envisioned that the elements and features illustrated or described in connection with one exemplary embodiment may be combined with the elements and features of another without departing from the scope of the present disclosure, and that such modifications and variations are also included in the scope of the present disclosure. For example, it is envisioned that a kit may be provided including the mat 100 (FIG. 1) together with one or more of the utensils 200 (FIGS. 1, 3, 4), the utensils $300_A$, $300_B$ (FIGS. 5, 6), the utensils 400 (FIGS. 7, 8), and/or the utensil 500 (FIGS. 9-11). Accordingly, the subject matter of the present disclosure is not to be limited by what has been particularly shown and/or described, except as reflected in the appended claims.

What is claimed is:

1. A food preparation system comprising:
    a mat including a deformable material permitting a first portion of the mat to be folded onto a second portion of the mat, wherein the mat is planar; and
    at least one utensil defining a height, the at least one utensil being positionable between the first and second portions of the mat such that a food product positioned between the first and second portions of the mat can be flattened to a thickness approximately equivalent to the height of the at least one utensil by applying a rolling force to the mat, wherein the at least one utensil includes a first utensil and a discrete second utensil, wherein the first utensil and the discrete second utensil includes a pair of first utensils and a pair of second utensils, respectively, configured and dimensioned for arrangement in a vertically stacked orientation on top of one another, wherein the pair of first utensils and the pair of second utensils each includes corresponding first engagement structures comprising one or more projections positionable within one or more corresponding recesses formed in the respective pair of first and pair of second utensils, wherein the pair of first utensils define a first height and the pair of second utensils define a second height different than the first height.

2. The food preparation system of claim 1, wherein the mat and the at least one utensil include a food grade material inhibiting adhesion to the food product.

3. The food preparation system of claim 2, wherein the mat and the at least one utensil include food grade silicone.

4. The food preparation system of claim 1, wherein the at least one utensil defines an interior space configured to receive the food product.

5. The food preparation system of claim 4, wherein the interior space defined by the at least one utensil is circular in configuration.

6. The food preparation system of claim 1, wherein the first utensil and the discrete second utensil include a corresponding second engagement structure to facilitate a connection of the first utensil and the discrete second utensil.

7. The food preparation system of claim 6, wherein the corresponding second engagement structure of the first utensil includes a first cutout, and the corresponding engagement structure of the discrete second utensil includes a second cutout, the first and second cutouts corresponding in configuration and dimensions.

8. The food preparation system of claim 1, wherein the pair of first utensils and the pair of second utensils are configured and dimensioned to increase the thickness of the food product.

9. The food preparation system of claim 1, wherein the mat includes at least one marking providing a user with information regarding one or more dimensions of the food product.

10. The food preparation system of claim 9, wherein the at least one marking is configured as a graduated ruler.

11. The food preparation system of claim 9, wherein the at least one marking is configured as at least one circle.

12. The food preparation system of claim 11, wherein the at least one marking is configured as a plurality of concentric circles.

13. A food preparation system comprising:
a mat including a deformable material permitting a first portion of the mat to be folded onto a second portion of the mat, wherein the mat is planar; and
at least one utensil defining a height, the at least one utensil being positionable between the first and second portions of the mat such that a food product positioned between the first and second portions of the mat can be flattened to a thickness approximately equivalent to the height of the at least one utensil by applying a rolling force to the mat, wherein the at least one utensil includes a first utensil and a discrete second utensil, wherein the first utensil and the discrete second utensil includes a pair of first utensils and a pair of second utensils respectively, wherein the pair of first utensils and the pair of second utensils are configured and dimensioned for arrangement in a vertically stacked orientation on top of one another to increase the thickness of the food product, wherein the pair of first utensils and the pair of second utensils each includes corresponding engagement structures comprising one or more projections positionable within one or more corresponding recesses formed in the respective pair of first and pair of second utensils.

14. The food preparation system of claim 13, wherein the mat includes at least one marking providing a user with information regarding one or more dimensions of the food product.

15. The food preparation system of claim 14, wherein the at least one marking is configured as a graduated ruler.

16. The food preparation system of claim 14, wherein the at least one marking is configured as at least one circle.

17. The food preparation system of claim 16, wherein the at least one marking is configured as a plurality of concentric circles.

* * * * *